Patented Mar. 7, 1944

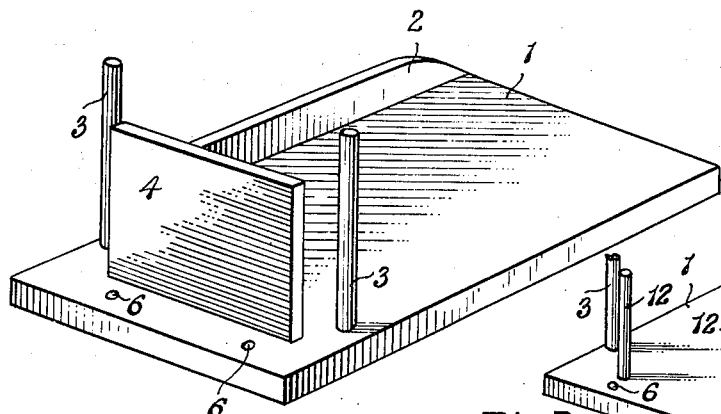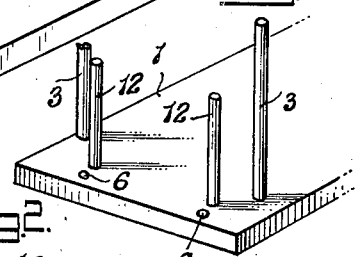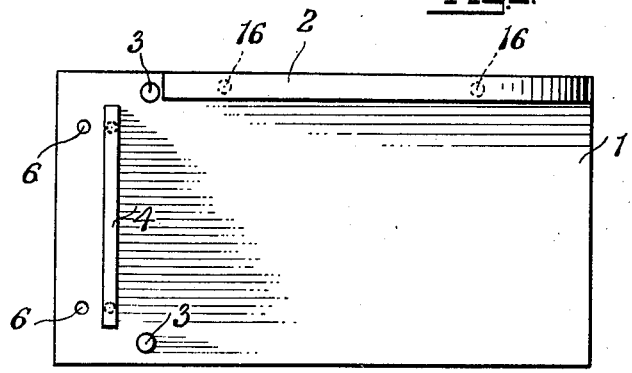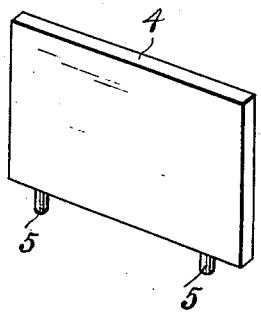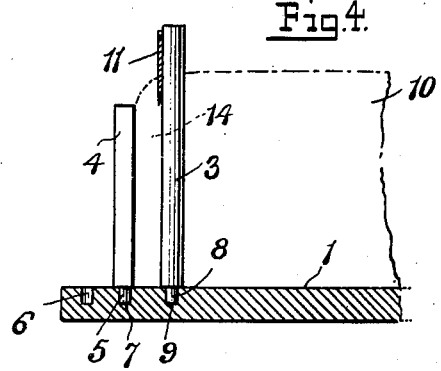

2,343,448

UNITED STATES PATENT OFFICE 2,343,448

SLICING DEVICE

Mabel C. Fay, Floral Park, N. Y.

Application January 28, 1943, Serial No. 473,782

3 Claims. (Cl. 146—150)

This invention relates to slicing devices, and more particularly to those employed for slicing bread, meats, cheese, butter or any other products into slices of uniform thickness.

The primary object of the present invention is to provide a device of this character which may simply and economically be made of any readily available material such as wood, for example, which can be conveniently used in the home; which can be assembled or disassembled without the use of tools; which can be packed flat for storage or shipment, and which will effectively slice bread, meat or any other sliceable articles or material into thin or thick slices as required by the user.

More particularly, the invention contemplates the provision of a base upon which the bread or other article to be sliced is rested, with several removable knife-guide posts arising from the base and between which the bread loaf is moved toward a stop spaced from the knife-guide posts, to thereby determine the thickness of the slices to be cut from the loaf. The invention contemplates the provision of means by which the stop may be spaced at one or more selected distances from the knife-guide posts to thereby control the thickness of the slices to be cut, and of means by which said stop will act as a supporting means or pressure plate against which the end of the loaf is held to thereby permit the slice being cut to be compressed against it and supported to permit of the severance of a very thin slice when such a slice is desired.

In the accompanying drawing, wherein an embodiment of the invention is disclosed:

Fig. 1 is a perspective view of a slicing device, constructed in accordance with the invention;

Fig. 2 is a plan view of the same;

Fig. 3 is a perspective view of the stop or gauge plate;

Fig. 4 is a sectional view through the base board, showing how the bread is sliced; and Fig. 5 is a perspective view of a modified structure.

With reference to the structure shown in Figs. 1 to 4, inclusive, I indicates the base board upon which the bread or other article to be sliced is rested during the slicing operation. One edge of the board 1 is provided with an upstanding flange or wall 2 to enable the bread loaf 10, diagrammatically shown in Fig. 4, to be so positioned that it may be moved between the upstanding knife-guide posts 3. These posts are shown of cylindrical form, but may be of any other suitable cross-sectional shape, and are removably secured to the board by entering into recesses 9 provided therein, the lower ends of the posts having stud portions 8 tightly, but removably, fitting into the recesses.

The posts 3 are so spaced apart as to permit of a loaf of bread or other article to be sliced, to be moved between them and brought against a stop or gauge member 4 positioned at a predetermined distance from the posts 3. In the form shown in Figs. 1 and 3, the stop or gauge 4 consists of a plate member having its lower end provided with several integral studs 5 fitting into recesses 7 provided in the upper portion of the base board 1, to thereby form the stop member 4 into a vertical wall extending transversely of the base board.

The recesses 7 into which the studs 5 are fitted are so positioned relative to the posts 3 that the stop 4, when fitted into said recesses, is positioned at a predetermined distance from the posts to thereby determine the thickness of the slice to be cut from the loaf by a knife 11 held against and guided by the posts 3. In addition to the recesses 7, I provide one or more additional sets of recesses, one set being shown at 6, so that by the placement of the studs 5 of the stop 4 in a selected set of recesses in the base board, the thickness of the slices cut from the loaf will be controlled.

It will be noted that the stop 4 is of such a size that it extends over a substantial portion of the area of the slice to be cut so that while the slice is being cut, as indicated in Fig. 4, it is being supported by being compressed slightly against the surface of the stop. The support so afforded by a stop of substantial size, enables a slice to be cut which will have its opposite faces parallel, thus making it decidedly satisfactory for toasting, and particularly in toasters of the "pop-up" type wherein the slices of bread are inserted in slots and must be of uniform and specified thickness to secure the best results. Moreover, the support and compression of the slice between the stop and the cutting knife enables a very thin slice to be cut, and particularly from a loaf of fresh or soft bread, soft meat or the like.

In Figure 4, the manner in which the article is sliced is disclosed. The knife 11, which can be a bread knife or carving knife, is held against and guided by the surface of the posts 3 and drawn back and forth across the bread loaf 10 or other article. The loaf is held on the board with its end against the stop 4, and the thickness of the slice cut from the loaf, and indicated at 14, will be determined by the distance between the stop 4 and the posts 3. When the slice is cut, it is easily removed from between the stop and the posts, and the loaf is shifted to bring its then end against the stop 4, at which time it is positioned for the cutting of the next slide.

I am aware that heretofore, efforts have been made to produce a slicing device for bread wherein the knife was guided and the bread was held against a stop spaced from the guides to secure a slice of predetermined thickness. Therefore, no effort is herein made to broadly claim such a device as the present invention. However, with such devices of the prior art, it is found difficult, if not wholly impossible, to slice bread, and particularly a fresh or soft loaf into very thin slices such as are used for so-called "Melba" toast and for canapés. The reason for this is that the slice being cut was not supported during the cutting operation. The present invention contemplates the use of a stop or gauge of such a size as to extend over a large portion of one face of the slice being cut, so that during the slicing operation, the slice is supported and compressed between the cutting knife 11 and the stop 4, and is thus held against collapse and distortion, with the result that a very thin slice can be cut from soft or fresh bread, and even with a relatively dull knife. An important feature of the present invention therefore resides in the means by which the slice being cut is supported in the manner described, so that the device can be very successfully used for the production of very thin slices of bread, meat or any other article or thing capable of being sliced by the means described.

In the embodiment of the invention shown in Fig. 5, the stop against which the end of the bread loaf is abutted, is composed of several spaced posts 12, removably fitted into recesses in the base board in the manner explained relative to the posts 3.

While I have herein described my invention as being particularly useful in connection with the slicing of bread, I do not limit the device to such use, but in herein referring to the "bread loaf" I wish to be understood as meaning meats, cheese, butter or any other article capable of being sliced by a device of the character described.

When the device is not in use, it can be packed flat by merely removing the upstanding parts, consisting of the posts 3 and stops 4 or 12, and placing them flatwisely on the upper face of the base board. This arrangement is also convenient for shipping the device in flat condition. Moreover, since the parts of the device are held together solely by frictional fit, metallic fastening elements or other metallic parts are completely eliminated, and the device may be wholly composed of wood or other available material. To facilitate the complete dismantling of the device, and its complete assembly without the use of nails, screws or other metallic fasteners, I have shown in Fig. 2, the flange or wall 2 secured to the base by studs 16 provided on the flange or wall 2, entering into recesses provided in the base for their reception.

What I claim is:

1. In a slicing device, a base board, said board having recesses in its upper surface, posts adapted to be received in said recesses and rising vertically therefrom, a second series of posts disposed at a distance from the first posts, the first series comprising knife guides and being spaced apart sufficiently to permit of the passage of the article to be sliced between them, the second series constituting stops against which an end of said article is rested, the base board having a series of recesses permitting positioning of the second series of posts in any one of several positions relative to the first posts.

2. A slicing board comprising, a base board having a plurality of recesses in its upper surface, knife guides consisting of spaced posts having their lower terminals frictionally fitted into several of said recesses, a stop having stud portions adapted to be frictionally fitted into other of said recesses at a distance from the posts, both the posts and the stop being held in said recesses solely by frictional fit therein.

3. A slicing board comprising, a base board having a plurality of recesses in its upper surface, knife guides comprising a pair of posts having their lower ends frictionally fitted into several of said recesses, stop means frictionally fitted into other recesses at a distance from the posts, said stop means consisting of several posts spaced closer together than the knife guides.

MABEL C. FAY.